United States Patent [19]
Crites et al.

[11] 3,931,683
[45] Jan. 13, 1976

[54] DRYER FOR PARTICULATE MATERIAL

[76] Inventors: Ray D. Crites, 4324 Westbrook Drive; David A. Block, 318 Hilltop St.; Paul H. Sidles, 1506 Wilson St., all of Ames, Iowa 50010

[22] Filed: Nov. 18, 1974

[21] Appl. No.: 524,761

[52] U.S. Cl. .......................... 34/169; 34/73; 34/78; 34/86; 34/175
[51] Int. Cl.² ........................................ F26B 17/12
[58] Field of Search .............. 34/86, 73, 74, 75, 77, 34/78, 165, 167, 168, 169, 172, 174, 177, 178, 225, 233

[56] References Cited
UNITED STATES PATENTS

| | | | |
|---|---|---|---|
| 2,350,644 | 6/1944 | Simpson et al. | 34/170 |
| 2,777,212 | 1/1957 | McOmber | 34/167 |
| 2,910,783 | 11/1959 | Hoyt | 34/77 |
| 3,572,427 | 3/1971 | Buffington | 34/73 |
| 3,762,065 | 10/1973 | Wahlgren | 34/73 |

FOREIGN PATENTS OR APPLICATIONS

| | | | |
|---|---|---|---|
| 784,861 | 10/1957 | United Kingdom | 34/174 |

*Primary Examiner*—John J. Camby
*Assistant Examiner*—James C. Young
*Attorney, Agent, or Firm*—Wegner, Stellman, McCord, Wiles & Wood

[57] ABSTRACT

A dryer for particulate material combines the drying effect of a stream of heated gas circulated by a blower in a closed duct system with that of a radiator structure which is in the drying chamber and is in a heat pump circuit. The condenser of the heat pump circuit is in the duct system where it condenses moisture from the gas which has passed through the particulate material. The heat pump compressor is driven by an internal combustion engine which is in a compartment in heat exchange relationship with the duct system. The engine cooling system radiator is immediately downstream from the condenser and the engine exhaust system includes a heat exchanger which is in the duct downstream from the engine cooling radiator.

13 Claims, 2 Drawing Figures

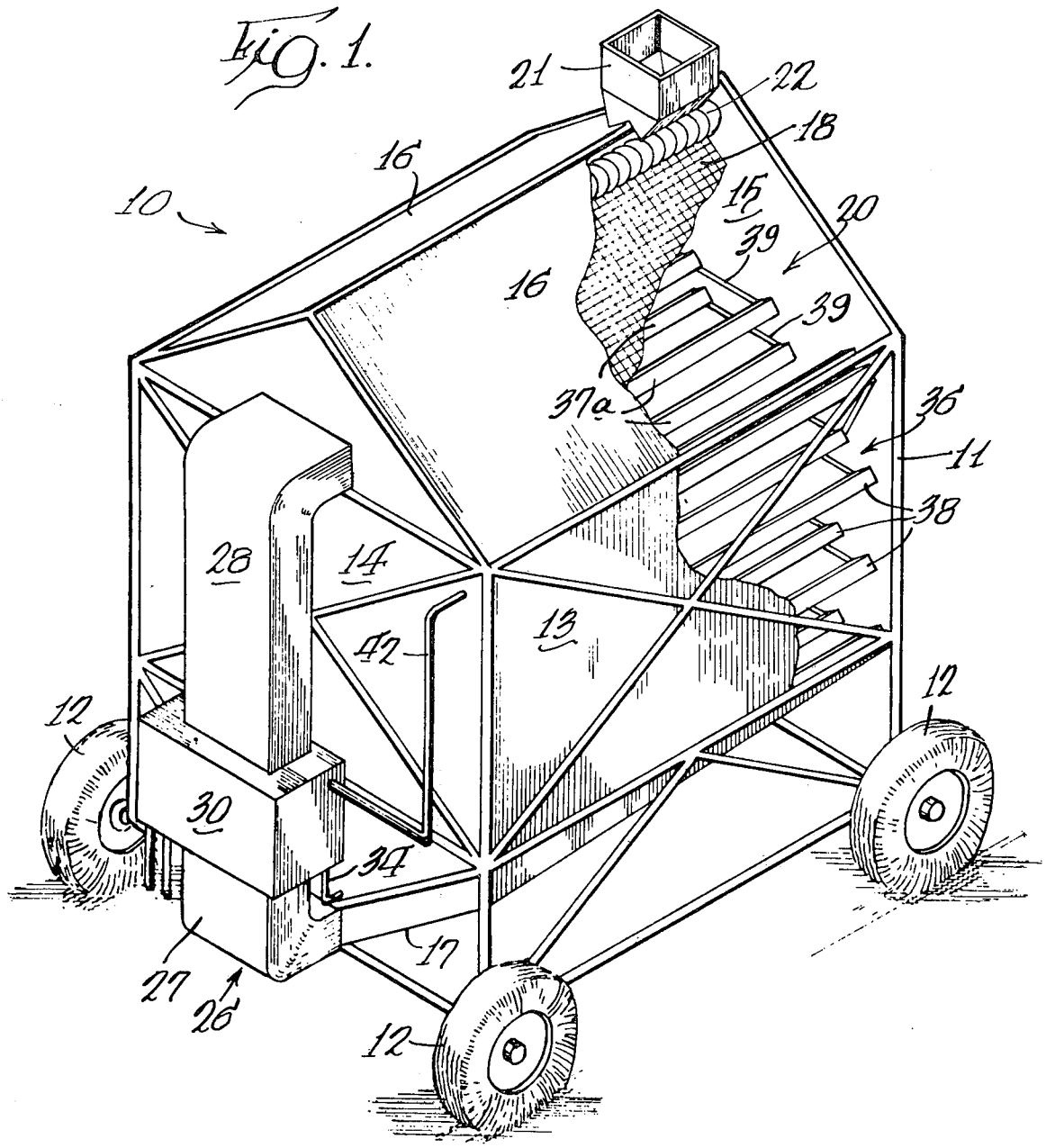

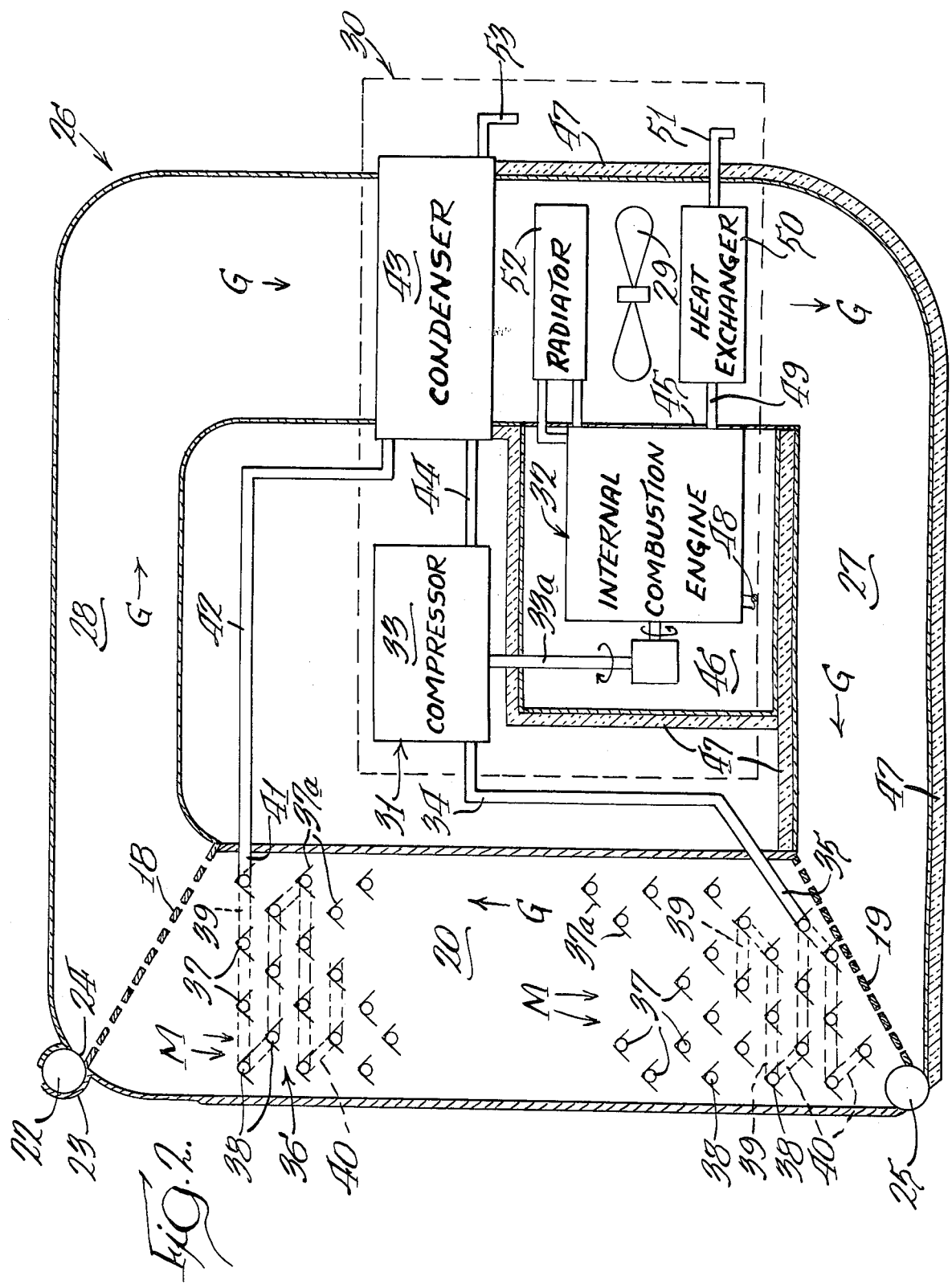

DRYER FOR PARTICULATE MATERIAL

BACKGROUND OF THE INVENTION

Most dryers for particulate material, such as grain, make relatively inefficient use of the energy which is expended in the drying process. The commonest dryers of this type burn a fuel such as liquid propane and utilize the heated air and products of combustion as the sole source of heat for drying the grain, except to the extent that metal parts of the drying chamber may also become heated by the air and combustion products.

A patent which discloses a different heat source is McOmber U.S. Pat. No. 2,777,212, which discloses a grain drying system mounted upon a combine in which the heat from an internal combustion engine for driving the combine is utilized to heat the air for drying grain.

Either of the above types of dryers is relatively inefficient because they continually introduce unheated air from the ambient atmosphere, heat it, pass it through the grain, and then discharge the moisture laden air to the ambient atmosphere.

Closed circuit drying systems for laundry dryers are disclosed in Whitesel U.S. Pat. No. 2,660,806 and Shewmon U.S. Pat. No. 2,676,418. They utilize a thermal pump system with a heat exchanger in a duct upstream from a tumbling drum and the heat pump condenser in the duct downstream from the drum. The heat pump compressor delivers compressed fluid through the heat exchanger to the condenser. A similar arrangement for removing cleaning solvent from textiles is disclosed in Freze U.S. Pat. No. 3,831,294, except that there is an air heating coil upstream from the drum and an air cooling coil downstream from the drum; but without utilizing a thermal pump system.

The foregoing systems make relatively inefficient use of the energy which heats the fluid for the heat exchanger because only the circulating air, rather than the material to be dried, comes into contact with the heat exchanger.

SUMMARY OF THE INVENTION

The principal object of the present invention is to provide a dryer for particulate material, such as grain, which makes extremely efficient use of energy which enters the drying system.

Another object of the invention is to provide a highly efficient grain dryer for agricultural use.

In accordance with the invention, grain flows by gravity through a drying chamber which is part of a closed duct system having a blower which circulates gas through the drying chamber countercurrent to the flow of grain through the chamber.

The drying chamber is provided with radiator means in the form of numerous vertically spaced tiers of pipes that have inverted V-shaped heat exchange fins and that are arranged to cause serpentine flow of grain through the drying chamber. A hot fluid inlet at the bottom of the radiator means receives fluid from the high pressure side of a compressor, and a cool fluid outlet at the top of the radiator delivers the fluid to a condenser which is in the duct system where it condenses moisture from the stream of gas which is passed through the drying chamber. From the condenser the fluid returns to the low pressure side of the compressor, as in any conventional thermal pump circuit.

The compressor is driven by an internal combustion engine which is in a closed compartment in heat exchange relationship to the duct downstream from the condenser. The engine has a cooling system with a radiator which is in the duct immediately downstream from the condenser where it gains the maximum cooling effect from the deeply chilled gas which has passed over the condenser coils. In the duct downstream from the engine cooling system radiator and the blower is a heat exchanger through which the exhaust gases from the engine are discharged to the ambient atmosphere.

The internal combustion engine makes notoriously poor use of the fuel which is used to operate it, as is evidenced by the enormous amount of heat released by an operating engine. The dryer of the present invention, while using the inherently inefficient internal combustion engine to drive the thermal pump compressor, nevertheless makes very efficient use of the fuel consumed by the engine because the heat from the engine is used to preheat the gas which is circulated through the drying chamber.

The energy required to operate the compressor enters very efficiently into the drying operation because the compressed fluid passes through the radiator in the drying chamber to heat the inverted V-shaped heat exchange fins which are in direct contact witth the material to be dried.

THE DRAWINGS

FIG. 1 is a perspective view, with parts broken away, of a grain dryer embodying the invention; and FIG. 2 is a diagrammatic view of the dryer of the invention.

DETAILED DESCRIPTION OF THE INVENTION

Referring first to FIG. 1, a grain dryer, indicated generally at 10, has an external frame 11 provided with wheels 12. Mounted within the frame are sidewalls such as the wall 13, end walls 14 and 15, inclined top walls 16, and inclined floor panels 17, which define an enclosure. Immediately beneath the top walls 16, and parallel with them, are screens 18, and immediately above the floor panels 17, and parallel with them, are bottom screens 19. The space between the sidewalls, the end walls and the screens defines a drying chamber 20.

Particulate material M to be dried, such as grain, is fed into a receiver 21 and is picked up by a distributor auger 22 which is mounted in an auger tube 23 that is open at the bottom as indicated at 24 in FIG. 2; so the auger may distribute the material along the upper screen 18 from end to end of the drying chamber 20, with the screen 18 in turn distributing the material laterally across the drying chamber. The material flows downwardly by gravity through the drying chamber as indicated by the downwardly directed arrows in FIG. 2. At the bottom of the drying chamber 20, the material is caught on the lower screens 19 which are fine enough to retain the material which slides laterally on the screens 19 to a discharge auger 25 which carries it to the end beneath the inlet 21 where it is discharged into any suitable conveying device such as a raddle conveyor or a receiving hopper of an air conveyor.

The augers 22 and 25, when they are filled with material, function in the manner of air locks so that the drying chamber is, essentially, not open to the ambient atmosphere.

The drying chamber 20 is a part of a closed duct system, indicated generally at 26, which includes an input portion 27 communicating with the chamber 20 through the lower screen 19, and a return portion 28 which communicates with the drying chamber through the upper screen 18. A blower 29 (FIG. 2) circulates gas through the closed duct system 26 as indicated by the arrows G in FIG. 2.

When a dryer embodying the present invention is used to dry grain, the gas circulated through the duct system is ordinarily air. However, for other types of granular material M the circulating gas may not be air; and in such a case true air locks may be used to introduce material to and remove it from the drying chamber 20, so that none of the circulating gas escapes from the system. Accordingly, the term "air lock means" as used in the claims should be understood to include either augers which are sufficiently gas tight when filled with material to prevent any excessive leakage of air, or true air locks which are capable of producing a completely gas tight system.

Between the duct portions 27 and 28, the duct passes through a housing, indicated generally at 30, which houses parts of a thermal pump system, indicated generally at 31, and an internal combustion engine, indicated generally at 32, which furnishes the power for the thermal pump system 31, for the augers 22 and 25, and for the blower 29.

The thermal pump system 31 includes a compressor 33 from the high pressure side of which a hot fluid conduit 34 is connected to an inlet 35 of radiator means, indicated generally at 36, which is located in the drying chamber 20.

The radiator means 36 consists of a large number of horizontal pipes 37 which extend longitudinally of the drying chamber 20 and are arranged in vertically spaced tiers 38. The pipes in each tier 37 are joined by transverse connector pipes 39, and adjacent tiers are connected by risers 40. The uppermost tier of pipes 38 has an outlet 41 communicating with a cool fluid conduit 42 through which the heat pump fluid enters a condenser 43 which is mounted in the duct within the housing 30. From the condenser 43 a fluid return conduit 44 carries the fluid of the heat pump system to the low pressure side of the compressor 33.

Alternate tiers 38 of pipes 37 are seen in FIG. 2 to be staggered, and each of the pipes 37 is provided with inverted V-shaped heat exchange fins 37a the disposition of which within the chamber 20 is such that material M flowing by gravity through the drying chamber 20 follows a generally serpentine path.

The internal combustion engine 32 is drivingly connected to a drive shaft 33a of the thermal pump compressor 33; and as seen in FIG. 2 the engine is in heat exchange relationship with a thin metal wall 45 of the duct within the housing 30; while the engine 32 is otherwise enclosed in an insulated compartment 46. In addition, the sides of the duct, other than the thin sheet metal wall 45, within the housing 30 are covered with insulation 47, as is the duct portion 27.

The internal combustion engine 32 is enclosed except for a combustion air inlet pipe 48 which connects the carburetor (not shown) of the engine with the ambient atmosphere, and exhaust gas outlet means 49 which passes through a heat exchanger 50 in the duct that is located downstream from the blower 29. Exhaust gases are discharged to the ambient atmosphere through an exhaust pipe 51.

The internal combustion engine 32 is of the water cooled type, and has a radiator 52 which is mounted in the duct immediately downstream from the condenser 43 and upstream from the blower 29.

In operation, gas which is circulated through the closed duct system 26 including the drying chamber 20 leaves the condenser 43 in a very dry, cold condition so as to afford the maximum cooling and absorb the most possible heat from the radiator 52 of the engine cooling system. The air is then further heated by passing through the heat exchanger 50; and it then goes through the insulated portion 27 of the conduit and into the lower end of the drying chamber 20 through which it passes upwardly, absorbing moisture vaporized from the material in the chamber by the combined action of the radiator 36 and the hot gas itself. Moisture laden gas emerging from the upper end of the drying chamber 20 passes through the return duct 28 to the condenser 43 where it is rapidly chilled and loses practically all of its moisture which is collected in a pan or tank and is drained through a condensate discharge pipe 53.

Conveniently one end of the crank shaft of the internal combustion engine 32 is provided with a pulley or sprocket that affords a belt or chain drive for the blower 29; while the other end of the crank shaft drives an output shaft which is journalled in a wall of the insulated engine compartment 46 and acts through any suitable manual clutches and speed reduction means to provide the necessary low speed drives for the augers 22 and 25. Likewise, a clutch is necessary between the engine output shaft and the compressor input shaft 33a so that the only load on the engine during starting is that of the blower 29 and the pump for the liquid cooling system that includes the radiator 52.

The foregoing detailed description is given for clearness of understanding only and no unnecessary limitations should be understood therefrom, as modifications will be obvious to those skilled in the art.

We claim:

1. A dryer for particulate material comprising, in combination:
    a drying chamber through which particulate material flows by gravity;
    first air lock means for admitting particulate material to the upper end of said drying chamber;
    second air lock means for removing particulate material from the lower end of the drying chamber;
    a thermal pump system including a compressor having a low pressure side and a high pressure side, radiator means in the drying chamber which is directly contacted by said particulate material as it passes through said chamber, said radiator means having an inlet and an outlet, a condenser, a hot fluid conduit connecting the high pressure side of the compressor to the radiator inlet, a cool fluid conduit connecting the radiator outlet to the condenser, and a fluid return conduit from the condenser to the low pressure side of the compressor;
    a closed duct system which includes the drying chamber, and blower means in the duct system to circulate gas through said drying chamber in countercurrent to the flow of particulate material so as to absorb moisture vaporized from the material;
    means for heating said gas in the duct system before it enters the drying chamber, the condenser of the thermal pump system being positioned in the duct system upstream from the heating means where it condenses moisture from the gas which has left the drying chamber;

and condensate discharge means for removing condensed moisture from the duct system.

2. The dryer of claim 1 in which the radiator means comprises a plurality of vertically spaced tiers of generally horizontal pipes so that the particulate material flows over said tiers of pipes, and risers connecting said tiers of pipes.

3. The dryer of claim 2 in which the pipes in successive tiers are staggered, and inverted V-shaped heat exchange fins on said pipes are positioned to cause serpentine flow of particulate material.

4. The dryer of claim 2 in which the radiator inlet is connected to the pipes in the lowermost tier and the radiator outlet is connected to the pipes in the uppermost tier.

5. The dryer of claim 1 which includes an internal combustion engine for driving the compressor, and in which the means for heating gas in the duct system includes a heat exchanger provided with pipes for the engine exhaust gases.

6. The dryer of claim 5 in which the internal combustion engine is provided with cooling means which is located in the duct system immediately downstream from the condenser and upstream from the heat exchanger.

7. The dryer of claim 6 in which the cooling means comprises a liquid cooling system which has a radiator located in the duct system.

8. The dryer of claim 5 in which the internal combustion engine is in a closed compartment, and a combustion air inlet pipe and an exhaust gas outlet pipe connect said engine to the ambient atmosphere.

9. The dryer of claim 1 which includes a closed compartment in heat exchange relationship with the duct system downstream from the condenser, an internal combustion engine in said compartment for driving the compressor, a combustion air inlet pipe connecting the engine with the ambient atmosphere, a heat exchanger in the duct system provided with pipes for the engine exhaust gases, said pipes discharging to the ambient atmosphere, and cooling means for the engine which is located in the duct system immediately downstream from the condenser and upstream from the heat exchanger.

10. The drying of claim 9 in which the cooling means comprises a liquid cooling system which has a radiator located in the duct system.

11. A dryer for particulate material comprising, in combination:

a drying chamber through which particulate material flows by gravity;

first air lock means for admitting particulate material to the upper end of said drying chamber;

second air lock means for removing particulate material from the lower end of the drying chamber;

radiator means in the drying chamber;

means including a pump for circulating hot fluid through said radiator means;

a closed duct system which includes the drying chamber, and blower means in the duct system to circulate gas through said drying chamber in countercurrent to the flow of particulate material so as to absorb moisture vaporized from the material;

an internal combustion engine for driving the pump, said engine being in heat exchange relationship to the duct system;

heat insulating means enclosing said internal combustion engine to reduce radiation of engine heat to the ambient atmosphere;

a combustion air inlet pipe and exhaust gas outlet means connecting said engine to the ambient atmosphere, said exhaust gas outlet means passing through the closed duct system downstream from the blower means;

a heat exchanger in the duct system adjacent the engine, said heat exchanger including the exhaust gas outlet means;

cooling means for the engine which is located in the duct system adjacent the blower means;

a condenser which is located in the duct system immediately upstream from the engine cooling means where it condenses moisture from the gas which has left the drying chamber;

and condensate discharge means for removing condensed moisture from the duct system.

12. The dryer of claim 11 in which the radiator means in the drying chamber comprises vertically spaced tiers of generally horizontal heat exchange pipes which are provided with inverted V-shaped heat radiating fins, and the pipes in adjacent tiers are staggered to cause serpentine flow of material through said chamber.

13. The dryer of claim 11 in which the cooling means for the engine comprises a liquid cooling system which has a radiator located in the duct system.

* * * * *